Feb. 14, 1967 H. F. GEIGER 3,303,568
COURSE PROTRACTOR
Filed Dec. 7, 1964

HANS F. GEIGER,
INVENTOR.

BY Robert A. Spray
ATTORNEY

United States Patent Office 3,303,568
Patented Feb. 14, 1967

3,303,568
COURSE PROTRACTOR
Hans F. Geiger, 5845 N. New Jersey,
Indianapolis, Ind. 46204
Filed Dec. 7, 1964, Ser. No. 416,506
5 Claims. (Cl. 33—75)

This invention relates to a navigational instrument, such as may be used in navigating a ship or plane.

Steering a ship or plane by a compass is complicated by factors which make inaccurate a simple uncorrected compass heading based upon a chart-indicated bearing or course. Those factors include "variation" (a difference between true north and magnetic north indicated by a compass at any location on the earth) and "deviation" (the compass-deflecting effect of the ship construction and of material on board the ship).

Although the arithmetic is relatively simple, for the making of corrections to account for these factors of variation and deviation, it is far from certain that a user will always apply the correction factors correctly, for he may make an arithmetic error, or he may apply the correction factors incorrectly.

A mistake in applying these correction factors can be a small nuisance or be quite costly, depending on the amount of time the ship is steered on the wrong course, the nature of the route and its danger locations, etc.

Concepts of the invention, accordingly, provide a relatively simple and convenient device which permits and provides convenient and certain application of correction factors of variation and deviation, providing a direct reading of the corrected course-heading.

A more detailed explanation of the invention concepts and details, together with an explanation of the use of the device, is given in the following detailed description of an illustrative embodiment of the invention, reference being had to the accompanying somewhat diagrammatic drawings, in which.

Figure 1:
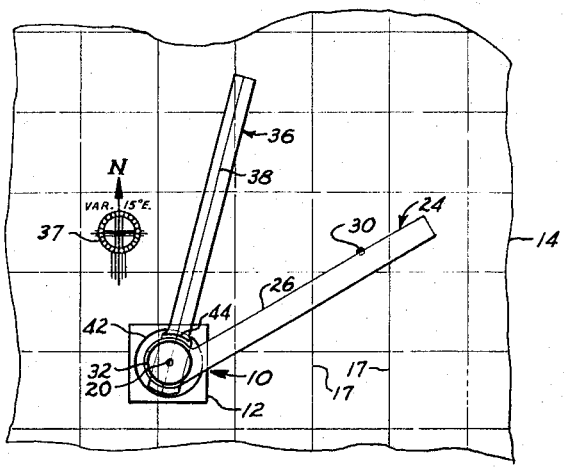
FIG. 1 is a view of a course protractor according to the present invention, in assembled form, and placed on a map or chart, in a step of its use.
Figure 2:
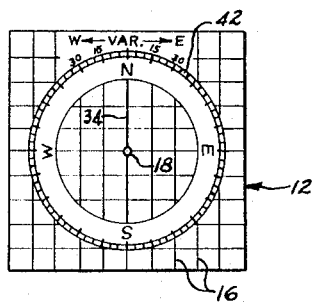
FIG. 2 is a plan view of a first indicator member thereof, which provides a variation scale.
Figure 4:
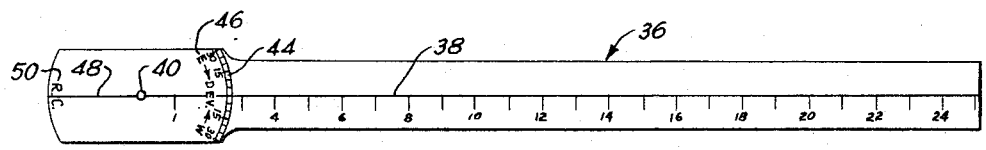
FIG. 4 is a plan view of a third indicator member thereof, which provides a deviation scale, and a corrected course designator line for setting variation and deviation.
Figure 3:
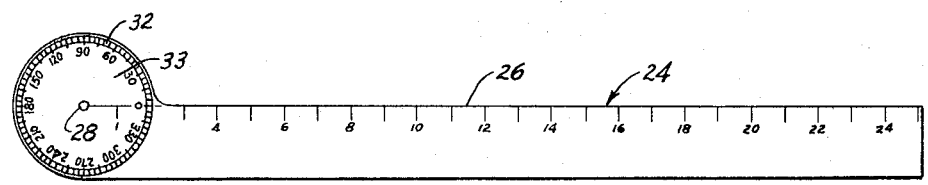
FIG. 3 is a plan view of a second indicator member, which provides a compass-heading scale and a chart-course line.

As shown in the drawings, a course protractor 10 according to the illustrated embodiment of the invention, comprises just three indicator pieces or members, rotatably interconnected. These components will be now described in connection with an explanation of the navigational use of the protractor device 10 by a ship.

The first navigational operation to be described will be that of determining the ship's corrected compass heading, for the ship to be steered, in heading from a point of departure toward the desired destination, the factors of variation and deviation being accounted for in the correction.

Figure 5:
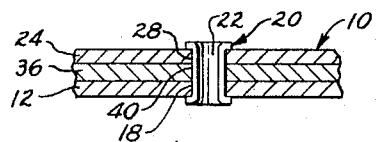
FIG. 5 is a fragmentary cross-sectional detail, showing the interconnection of the indicator members shown in FIGS. 2 through 4.

First, the user places the first indicator member 12 on the chart 14, with the north-south grid lines 16 of member 12 aligned with the longitude (north-south) lines 17 on the chart 14, and with the central aperture 18 of indicator member 12 over the point of departure. The member 12 is transparent, facilitating this positioning; and the connection of the three indicator members is by an eyelet 20 (FIG. 5) having a hollow central portion 22 for observing the point of departure on the chart. This first indicator member 12 is held steady on the chart during subsequent operations.

Next, the true bearing, or course reading, for the intended course is determined by rotating the second transparent indicator member 24 until its chart-course edge-line 26 (which passes through the aperture 28 of member 24) is directed along the intended course of the ship, as by aligning that line 26 with a point of destination 30 as in FIG. 1.

The true course reading, for the intended course on the chart, may then be read on the 360-degree scale 32 carried on a generally circular portion 33 of the second indicator member 24 (that portion 33 and scale 32 being concentric about aperture 28) where that scale 32 is intersected by north-south line 34 of the first indicator member 12. In the illustrative operation, that heading is sixty degrees east of north, or as otherwise stated, "North, sixty degrees east."

Next, the user applies a variation correction, as now explained. He first notes the nature of variation correction (usually that correction is printed on the chart 14 adjacent the compass rose 37 nearest the point of departure). This variation is seen (in this illustrative operation) to be "15 degrees east."

Then the third transparent indicator member 36 is rotated until its central line 38 (which passes through its central aperture 40) is aligned, in accordance with that variation statement, on the variation scale 42 printed on the first member 12. This variation scale 42, it will be noted, is concentric around aperture 18, and begins at a zero mark aligned with the north direction on member 12, and extends in both eastwardly and westwardly directions from that zero mark, the easterly scale extending clockwise (rightwardly) from that zero mark and the westerly scale extending counter-clockwise (leftwardly) therefrom.

The third indicator member 36, it will be noted, is narrower in the region of eyelet 20 then the diameter of portion 33 of the second indicator member 24, this permitting the user to press down on peripheral portions of portion 33 to maintain the position of second indicator member 24 during movement of third indicator member 36.

Such a setting is illustrated in FIG. 1, the third indicator member 36 having been rotated to apply the 15-degree easterly variation correction.

The indicator members 12, 24, and 36 have been now corrected for magnetic variation; and the variation-corrected heading is read on scale 32 of second indicator member 24 at the point where that scale 32 is intersected by the line 38 of the third indicator member 36, that reading in the illustrative operation being 45-degrees.

Lastly, deviation-correction is to be applied. To do this, the third indicator member 36 is moved according to the nature of deviation stated by the ship's deviation tables, the movement being as indicated on a deviation scale 44 carried by the third indicator member 36. That scale 44 is concentric about aperture 40; and, when the three indicator members 12, 24, and 36 are held assembled by the eyelet 20, the scale 44 lies between scales 32 and 42.

The deviation scale 44 carries direction indicators 46, directing movement of member 36 clockwise (rightwardly) for eastwardly deviation, and directing movement of the member 36 counter-clockwise (leftwardly) for westwardly deviation.

Assuming that the deviation had been stated as "5-degrees west," the third indicator member 36 would be moved 5-degrees counterclockwise (leftwardly) as indicated by direction indicators 46, thus bringing the line 38 of third indicator member to add 5-degrees to the reading on scale 32; and the actual compass heading to be used, now corrected for both variation and deviation, is read on scale 32 of the second indicator member 24 at the point where that scale 32 is intersected by the line 38 of third indicator member 36. That reading, in the illustrative operation, is 50-degrees.

Permitting a reciprocal bearing or course to be used for magnetic or compass course, the third indicator membe 36 has its line 38 extended as at 48 past aperture 40, with a reciprocal course designation 50 indicating that the reciprocal course reading is to be read on scale 32 where it is intersected by that extension line 48.

The device 10 may also be used to determine a fix, or exact location, while traveling on a course, as follows:

Assume the user is traveling on the same 60-degree chart-course, with second indicator member 24 still adjusted to the chart course of 60-degrees; and assume there is noticed a lighthouse to starboard and a buoy to port. Take a pelorus reading on each; and write each reading down after subtracting each from 360-degrees (because the pelorus is on a clockwise scale and the scale 32 is counter-clockwise). Now for one of the markers, move the third indicator member 36 so that its line 38 intersects the written bearing. Then place edge-line 26 of indicator member 24 along the intended course, and slide the device 10 along that course-line until the line 38 of third indicator member 36 intersects that marker on the chart; and insert an instrument, such as a pencil, through the hollow bore 22 of eyelet 20, making a dot on the chart, and then draw a line through that dot and the chart marker. Do a similar operation with respect to the other chart marker.

Where these lines cross, the ship is actually located. If you are not on course, use this fixed location as a new point of departure, and plot a new compass-heading course to your destination as by the explained use of the device given above.

It is thus seen that a course protractor according the invention provides a device which is simple in construction, yet which is quite convenient and certain in its operation, being useful for both finding the corrected compass heading for the ship to be steered, taking account of and correcting for both variation and deviation, and the device also provides means for determining the location of the ship during its journey.

Thus, the present invention accomplishes its intended objects, including those hereinabefore pointed out and others that are inherent in the invention.

It will be understood that modifications and variations may be effected without departing from the scope of the novel concepts of the present invention. Accordingly, the invention is not to be considered limited to the specific form or arrangements herein described and shown.

What is claimed is:

1. A course protractor, comprising:
a first indicator member, having a north-south indicator, and carrying a variation scale having its zero-mark on said north-south indicator, and including an east-variation scale extending rightwardly from said zero-mark and a west-variation scale extending leftwardly therefrom, and provided with an aperture;
a second indicator member, being an arm-member carrying a course-heading scale and a chart-course line, said course-heading scale beginning at a zero point in line with said chart-course line and running counter-clockwise, the said second member being provided with an aperture around which said scale is concentric and toward which said chart-course line is directed;
a third indicator member, carrying a corrected-course designator line and carrying also a deviation scale beginning at a zero point in line with said corrected-course designator line, including an east-deviation indicator directing movement of said third member clockwise for east-deviation and a west-deviation indicator directing movement of said third member counter-clockwise for west-deviation, the said third member being provided with an aperture toward which said corrected-course designator line is directed; and
means extending through said apertures rotatably interconnecting the said three indicator members, said means provided with a hollow bore;
the said first indicator member being formed to provide substantial transparent areas facilitating positioning of the device at a specific location on an associated chart, and the said second and third indicator members being formed to provide substantial transparent areas at least in the region of the said scales, and all of the said scales being operatively adjacent and concentrically arranged with each other and with the indicator-members-connecting means, providing that the scales are co-operatively usable.

2. A course protractor, comprising:
a first indicator member, having a north-south indicator, and carrying a variation scale having its zero-mark on said north-south indicator, and including an east-variation scale extending rightwardly from said zero-mark and a west-variation scale extending leftwardly therefrom, and provided with a connecting means;
a second indicator member, being an arm-member carrying a course-heading scale and a chart-course line, said couse-heading scale beginning at a zero point in line with said chart-course line and running counter-clockwise, the said second member being provided with a connecting means around which said scale is concentric and toward which said chart-course line is directed;
a third indicator member, carrying a corrected-course designator and carrying also a deviation scale beginning at a zero point in line with said corrected-course designator, including an east-deviation indicator directing movement of said third member clockwise for east-deviation and a west-deviation indicator directing movement of said third member counter-clockwise for west-deviation, the said third member being provided with a connecting means toward which said corrected-course designator is directed;
the said first indicator member being formed to provide substantial transparent areas facilitating positioning of the device at a specific location on an associated chart, and the said second and third indicator members being formed to provide substantial transparent areas at least in the region of the said scales, and all of the said scales being operatively adjacent and concentrically arranged with each other and with the indicator-members-connecting means, providing that the scales are co-operatively usable;
and means interconnecting the connecting means.

3. A course protractor, comprising:
a first indicator member, having a north-south indicator, and carrying a variation scale having its zero-mark on said north-south indicator, and including an east-variation scale and a west-variation scale and provided with a connecting means;
a second indicator member, being an arm-member carrying a course-heading scale and a chart-course line, the said second member being provided with a connecting means toward the center of which said chart-course line is directed, the said scale running counter-clockwise from the line of said chart-course line;
a third indicator member, carrying a corrected-course designator and carrying also a deviation scale beginning at a zero point in line with said corrected-course designator, including an east-deviation indicator directing movement of said third member in one direction for east-deviation and a west-deviation indicator directing movement of said third member in another direction for west-deviation, the said third member being provided with a connecting means toward the center of which said corrected-course designator is directed; and the connecting means including a concentric opening extending through the plane of all of said members;

the said first indicator member being formed to provide substantial transparent areas facilitating positioning of the device at a specific location on an associated chart, and the said second and third indicator members being formed to provide substantial transparent areas at least in the region of the said scales, and all of the said scales being operatively adjacent and concentrically arranged with each other and with the indicator-members-connecting means, providing that the scales are co-operatively usable;

and means interconnecting the connecting means.

4. A course protractor, comprising:

a first indicator member, having a north-south indicator, and carrying a variation scale having its zero-mark on said north-south indicator, and including an east-variation scale and a west-variation scale and provided with a connecting means;

a second indicator member, being an arm-member carrying a course-heading scale and a chart-course line, the said second member being provided with a connecting means toward the center of which said chart-course line is directed, the said scale running counter-clockwise from the line of said chart-course line, said scale being concentric with the center of said connecting means;

a third indicator member, carrying a corrected-course designator and carrying also a deviation scale beginning at a zero point in line with said corrected-course designator, including an east-deviation indicator directing movement of said third member in one direction for east-deviation and a west-deviation indicator directing movement of said third member in another direction for west-deviation, the said third member being provided with a connecting means toward the center of which said corrected-course designator is directed; and the said second member overlying the said third member, but with the third member being narrower in the region of said connecting means than is the diameter of said second member in said region, permitting the second member to be pressed down outwardly of said third member in said region to hold said second member in its set orientation while said third member is being adjusted;

the said first indicator member being formed to provide substantial transparent areas facilitating positioning of the device at a specific location on an associated chart, and the said second and third indicator members being formed to provide substantial transparent areas at least in the region of the said scales, and all of the said scales being operatively adjacent and concentrically arranged with each other and with the indicator-members-connecting means, providing that the scales are co-operatively usable;

and means interconnecting the connecting means.

5. A course protractor, comprising:

a first indicator member, having a north-south indicator, and carrying a variation scale having its zero-mark on said north-south indicator, and including an east-variation scale and a west-variation scale and provided with a connecting means;

a second indicator member, being an arm-member carrying a course-heading scale and a chart-course line, the said second member being provided with a connecting means toward the center of which said chart-course line is directed, the said scale running counter-clockwise from the line of said chart-course line, said scale being concentric with the center of said connecting means;

a third indicator member, carrying a corrected-course designator and carrying also a deviation scale beginning at a zero point in line with said corrected-course designator, including an east-deviation indicator directing movement of said third member in one direction for east-deviation and a west-deviation indicator directing movement of said third member in another direction for west-deviation, the said third member being provided with a connecting means toward the center of which said corrected-course designator is directed;

the said first indicator member being formed to provide substantial transparent areas facilitating positioning of the device at a specific location on an associated chart, and the said second and third indicator members being formed to provide substantial transparent areas at least in the region of the said scales, and all of the said scales being operatively adjacent and concentrically arranged with each other and with the indicator-members-connecting means, providing that the scales are co-operatively usable;

and means interconnecting the connecting means.

References Cited by the Examiner

UNITED STATES PATENTS

| 346,836 | 8/1886 | Almorth | 33—99 |
| 2,238,190 | 4/1941 | Sawtelle | 33—98 |
| 2,328,517 | 8/1943 | Von Opel | 33—98 X |
| 2,904,885 | 9/1959 | Wood | 33—75 X |
| 3,059,339 | 10/1962 | Danforth | 33—76 |

LEONARD FORMAN, *Primary Examiner.*

H. N. HAROIAN, *Assistant Examiner.*